US009944128B2

(12) United States Patent
Okazaki

(10) Patent No.: US 9,944,128 B2
(45) Date of Patent: Apr. 17, 2018

(54) PNEUMATIC TIRE

(71) Applicant: BRIDGESTONE CORPORATION, Chuo-ku, Tokyo (JP)

(72) Inventor: Naoto Okazaki, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 211 days.

(21) Appl. No.: 14/781,640

(22) PCT Filed: Apr. 1, 2014

(86) PCT No.: PCT/JP2014/001909
§ 371 (c)(1),
(2) Date: Oct. 1, 2015

(87) PCT Pub. No.: WO2014/162732
PCT Pub. Date: Oct. 9, 2014

(65) Prior Publication Data
US 2016/0059631 A1    Mar. 3, 2016

(30) Foreign Application Priority Data
Apr. 3, 2013  (JP) .................................. 2013-077513

(51) Int. Cl.
*B60C 9/22*     (2006.01)
*B60C 11/01*    (2006.01)
(Continued)

(52) U.S. Cl.
CPC .............. *B60C 9/20* (2013.01); *B60C 9/2009* (2013.01); *B60C 9/22* (2013.01); *B60C 9/28* (2013.01);
(Continued)

(58) Field of Classification Search
CPC .............. B60C 11/01; B60C 9/22; B60C 9/28
(Continued)

(56) References Cited

U.S. PATENT DOCUMENTS

2014/0326380 A1* 11/2014 Kotoku ................. B60C 9/0007
152/209.18

FOREIGN PATENT DOCUMENTS

CN     101583501 A     11/2009
JP     2000-062411 A    2/2000
(Continued)

OTHER PUBLICATIONS

English machine translation of JP2011-245938, no date.*
(Continued)

*Primary Examiner* — Robert C Dye
(74) *Attorney, Agent, or Firm* — Kenja IP Law PC

(57) ABSTRACT

A pneumatic tire including: on a tread of the tire, inclined belt layer and circumferential belt layer; and on the tread surface, a plurality of circumferential grooves extending in the tread circumferential direction, and shoulder land portions partitioned between the circumferential grooves located outermost in the tire width direction and tread ground contact ends. Positions of the tread surface that correspond to the outermost ends of the circumferential belt layer in the tire width direction are within the shoulder land portions, and the distance in the tire width direction between the outermost ends in the tire width direction of the circumferential belt layer and tire equator side ends of the shoulder land portions is 12% or more and 22% or less of a half of the width of the circumferential belt layer in tire width direction.

6 Claims, 6 Drawing Sheets

(51) Int. Cl.
  *B60C 9/20* (2006.01)
  *B60C 9/28* (2006.01)
  *B60C 11/00* (2006.01)
  *B60C 11/13* (2006.01)
(52) U.S. Cl.
  CPC .......... *B60C 11/0041* (2013.01); *B60C 11/01* (2013.01); *B60C 11/1307* (2013.01); *B60C 11/1323* (2013.01); *B60C 2009/2012* (2013.01); *B60C 2009/2019* (2013.01)
(58) Field of Classification Search
  USPC ....................................................... 152/531
  See application file for complete search history.

(56) References Cited

FOREIGN PATENT DOCUMENTS

| JP | 2008-201336 A | 9/2008 |
|---|---|---|
| JP | 2009-126363 A | 6/2009 |
| JP | 2009-184371 A | 8/2009 |
| JP | 2011-245901 A | 12/2011 |
| JP | 2011-245938 A | 12/2011 |
| JP | 2011-245941 A | 12/2011 |
| JP | 2012-035681 A | 2/2012 |
| JP | 4984013 B1 | 7/2012 |

OTHER PUBLICATIONS

English machine translation of JP2011-245941, no date.*
English machine translation of JP2012-035681, no date.*
Jul. 8, 2014 International Search Report issued in International Patent Application No. PCT/JP2014/001909.
Mar. 11, 2014, Notification of Reasons for Refusal issued by the Japan Patent Office in the corresponding Japanese Patent Application No. 2013-077513.

* cited by examiner

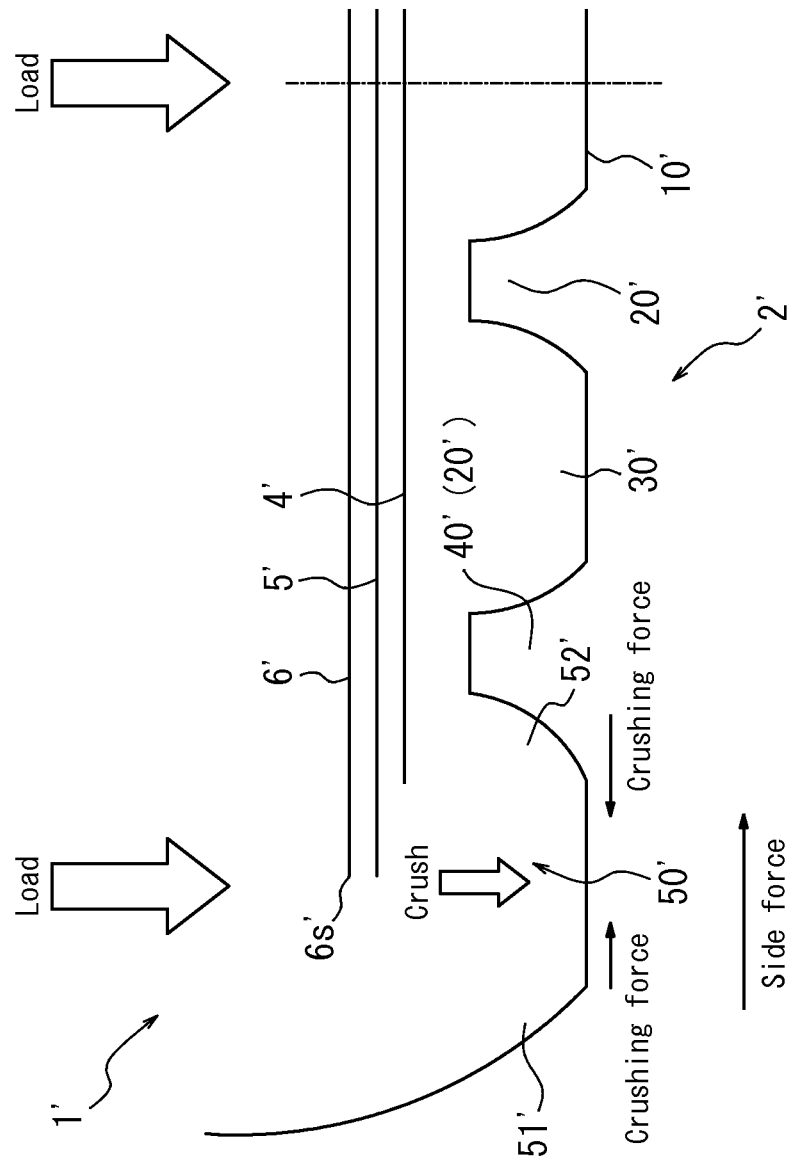

PNEUMATIC TIRE

TECHNICAL FIELD

This disclosure relates to a pneumatic tire, especially, a pneumatic tire suitable for use for heavy loading vehicles such as trucks and buses. In particular, this disclosure relates to a tire making it possible to achieve improved steering stability by increasing the side force acting on a tire when a slip angle is applied to the tire.

BACKGROUND

In recent years, as the performance of vehicles have been improved, chiefly in order to improve the side rigidity of the tires, flatter tires have been developed. On the other hand, an increase in the flatness of tires increases the diameter of the tires and induces separations starting at ends of the tire belts, thus reducing the durability of the tires.

As a technique for suppressing the increase in the diameter of a tire, providing one or more circumferential belt layers obtained by rubber-coating cords substantially extending in the tread circumferential direction is known (for example, see JP 2000-062411 A (PTL 1), JP 2009-184371 A (PTL 2), and JP 2009-126363 A (PTL 3). Here, the circumferential belt layer has a hooping effect in suppressing the protrusion in the tire radial direction due to the internal pressure or the rotation of the tire, which suppresses the increase in the tire diameter and accordingly improves the durability of the tire.

There are attempts to increase the width of a circumferential belt layer in the tire width direction thereby preventing uneven wear of a tire by increasing the rigidity of the tread and further improving the durability of the tire by suppressing the increase in the diameter in regions on the ground contact end side of the tread (see PTLs 2 and 3, respectively).

In general, the tread surface of a tire is provided with a plurality of circumferential grooves extending in the tread circumferential direction, and shoulder land portions are partitioned between the circumferential grooves located outermost in the tire width direction and ones on the tread ground contact ends.

Therefore, in a pneumatic tire having a circumferential belt layer with an increased width as described above, the outermost ends in the tire width direction of the circumferential belt layer often extend to positions in the tire width direction where the shoulder land portions are provided.

CITATION LIST

Patent Literature

PTL 1: JP 2000-062411 A
PTL 2: JP 2009-184371 A
PTL 3: JP 2009-126363 A

SUMMARY

Technical Problem

Here, FIG. 5 shows a cross section in the tire width direction of a half portion of a pneumatic tire having a circumferential belt layer with an increased width.

For that pneumatic tire 1', the circumferential belt layer has an increased width, which increases the rigidity of the tread and increases the side force acting on the whole tire due to the application of a slip angle to the tire.

On the other hand, with the application of a slip angle to the tire, when the load on a shoulder land portion 50' increases, a portion of the shoulder land portion 50' directly under the load is locally crushed between a circumferential belt layer 6' having high rigidity and a tread surface 2', as shown in FIG. 5. As the shoulder land portion 50' bulges in the tire width direction, shear strains are produced in an outer portion 51' of the shoulder land portion 50' that is on the outer side in the tire width direction and in a tire equator side portion 52' thereof. On that occasion, a force in the tire width direction (hereinafter referred to as "crushing force") acts on the land portion 50'.

Note that a crushing force is generally expressed as a product of the deformation of the land portion and the rigidity of the land portion.

Here, especially in the tire equator side portion 52' of the shoulder land portion, the crushing force acts in the direction opposite to the direction of the above-described side force acting on the tire, so that the side force is partially cancelled.

Accordingly, for the above tire in which the outermost ends in the tire width direction of the circumferential belt layer extend to the positions in the tire width direction where the shoulder land portions of the tread are provided due to the increased width of the circumferential belt layer, the side force could not be improved as expected and the steering stability achieved using the tire could not sufficiently be improved.

In view of the above, it could be helpful to provide a pneumatic tire which ensures durability of the tire and makes it possible to improve the steering stability.

Solution to Problem

The inventors diligently studied a method for improving the steering stability achieved using a pneumatic tire while ensuring the durability of the tire. The study led to the technique for optimizing the relative positions in the tire width direction of the outermost ends in the tire width direction of a circumferential belt layer and the tire equator side ends of shoulder land portions, thus obtaining the disclosed pneumatic tire.

We provide:

a pneumatic tire including: on a tread of the tire, at least one inclined belt layer obtained by rubber-coating a plurality of cords that are extended and inclined with respect to the tread circumferential direction and are arranged parallel to one another, and at least one circumferential belt layer obtained by rubber-coating a plurality of cords that are extended in the tread circumferential direction and are arranged parallel to one another, the circumferential belt layer being located on the inner side of the inclined belt layer in the tire radial direction; and on the tread surface, a plurality of circumferential grooves extending in the tread circumferential direction (hereinafter also referred to as "widthwise outermost circumferential grooves"), and shoulder land portions partitioned between the circumferential grooves located outermost in the tire width direction and tread ground contact ends (hereinafter also referred to as "widthwise outermost circumferential belt layer ends"). Positions of the tread surface that correspond to the outermost ends of the circumferential belt layer in the tire width direction are within the shoulder land portions. The distance in the tire width direction between the widthwise outermost ends of the circumferential belt layer and tire equator side ends of the shoulder land portions (hereinafter also referred to as "equator side shoulder land portion ends") is 12% or more and 22% or less of a half of the width of the circumferential belt layer in tire width direction.

With the distance in the tire width direction between the widthwise outermost circumferential belt layer ends and the equator side shoulder land portion ends being 12% or more of a half of the width of the circumferential belt layer in the tire width direction, the rigidity in the tire width direction associated with shear strain can be improved, in other words, the side force acting on the tire can be increased, thereby improving the steering stability achieved using the tire. Further, an effect of increasing the width of the circumferential belt layer that leads to further improvement in the durability of the tire can be achieved by preventing uneven wear and suppressing the increase in the diameter. Thus, the durability of the tire can be ensured.

Meanwhile, with the above distance in the tire width direction being 22% or less of a half of the width of the circumferential belt layer, the area of regions on which crushing force acts in the direction opposite to the direction of the side force acting on the tire equator sides of the shoulder land portions can be reduced and the area of regions on which shear force acts in the side force direction due to relative displacements of the belts and the tread can be increased. Accordingly, the side force acting on the tire is increased, thereby improving the steering stability achieved using the tire.

Note that "tread ground contact ends" refer to ends in the tire width direction of the tread surface. Here, "tread surface" refers to a surface of a tire that comes in contact with a flat plate upon application of a load corresponding to a predetermined load to the tire when mounted on an approved rim, inflated to a predetermined air pressure, and vertically placed on the flat plate in a stationary state. In this connection, "approved rim" refers to a rim specified in an industrial standard which is valid in an area where the tire is manufactured and used. Examples of the industrial standard include: JATMA (The Japan Automobile Tyre Manufacturers Association, Inc.) YEAR BOOK in Japan; ETRTO (European Tyre and Rim Technical Organisation) STANDARD MANUAL in Europe; TRA (THE TIRE and RIM ASSOCIATION INC.) YEAR BOOK in the United States; and the like; "predetermined load" refers to a maximum tire load specified in the aforementioned standards of JATMA etc.; and "predetermined air pressure" refers to the air pressure (the maximum air pressure) corresponding to a load predetermined depending on the size of the tire.

Yet further, unless otherwise noted, dimensions of our pneumatic tire are measured in a state where the tire has been mounted on an approved rim and inflated to a predetermined air pressure with no load thereon.

For our pneumatic tire, the distance between the tread ground contact ends and the rotation axis of the tire is preferably smaller than the distance between the tire equator and the rotation axis of the tire by more than 0% and 1.5% or less.

With the above structure, the tread surface can extend to the outer side in the tire width direction, the side force acting on the tire can be increased, and the steering stability achieved using the tire can be further improved.

Our pneumatic tire further includes land portions partitioned between the circumferential grooves. In the cross section in the tire width direction, the angle of inclination of groove walls on the outer sides in the tire width direction of the widthwise outermost circumferential grooves with respect to imaginary lines extending through the equator side shoulder land portion ends and intersecting the tread surface at right angles is larger than the angle of inclination of groove walls on the tire equator sides of the widthwise outermost circumferential grooves with respect to imaginary lines extending through outer ends in the tire width direction of the land portions adjacent to the shoulder land portions in the tire width direction and intersecting the tread surface at right angles.

As described above, for the circumferential grooves, with the inclination angle of the groove walls on the outer sides in the tire width direction being larger than the inclination angle of the groove walls on the tire equator sides, the crushing force acting on the tire equator sides of the shoulder land portions in the opposite direction to the side force can be reduced in the shoulder land portions. Therefore, the steering stability achieved using the tire can be further improved.

Note that "inclination angle of groove walls with respect to imaginary lines extending through ends of land portions and intersecting the tread surface at right angles" refers to a smaller one of the angles between the imaginary lines and the tangent lines of the groove walls at the end positions when the groove walls are curved.

Further, in our pneumatic tire, tire equator side portions of the shoulder land portions (hereinafter also referred to as "equator side shoulder land portions") are preferably each provided with an inclined surface that gradually reduces the height of the shoulder land portions from the outer sides in the tire width direction toward the widthwise outermost circumferential grooves and continuously extends to the groove walls on the outer side in the tire width direction of the widthwise outermost circumferential grooves.

The provision of an inclined surface on the equator side shoulder land portions can effectively reduce the crushing force at the equator side shoulder land portions, thereby improving the steering stability achieved using the tire.

Preferably, for our pneumatic tire, rubber members arranged at the tire equator side portions of the shoulder land portions (hereinafter also referred to as "equator side shoulder land rubber members") have a lower compressive modulus as compared with rubber members arranged on the outer sides in the tire width direction of the rubber members; and the boundaries between the rubber members are flat or curved surfaces extended and inclined with respect to a plane parallel to the tire equatorial plane and the thickness of the rubber members arranged at the tire equator side portions of the shoulder land portions gradually increases from the outer sides in the tire width direction toward the circumferential grooves.

With the above structure, the phenomenon in which the side force is partially cancelled by the crushing force can be effectively prevented and the side force can be increased, thereby improving the steering stability achieved using the tire.

Note that "compressive modulus" refers to a compressive modulus of elasticity measured in accordance with JIS K 6254. Specifically, a compressive modulus is a value found by measuring the displacement amount of a rubber test piece upon applying a load to the upper and lower surfaces of the rubber test piece at a predetermined rate using a compression tester, and dividing the load by the displacement amount.

Advantageous Effect

We can provide a pneumatic tire which ensures durability of the tire and improves the steering stability.

BRIEF DESCRIPTION OF THE DRAWINGS

In the accompanying drawings:

FIG. 5 is a cross-sectional view in the tire width direction of a half of a conventional pneumatic tire for illustrating the crushing force acting on a shoulder land portion of the tread.

DETAILED DESCRIPTION

Embodiments of our pneumatic tire will now be described in detail with reference to the drawings.

Figure 1:
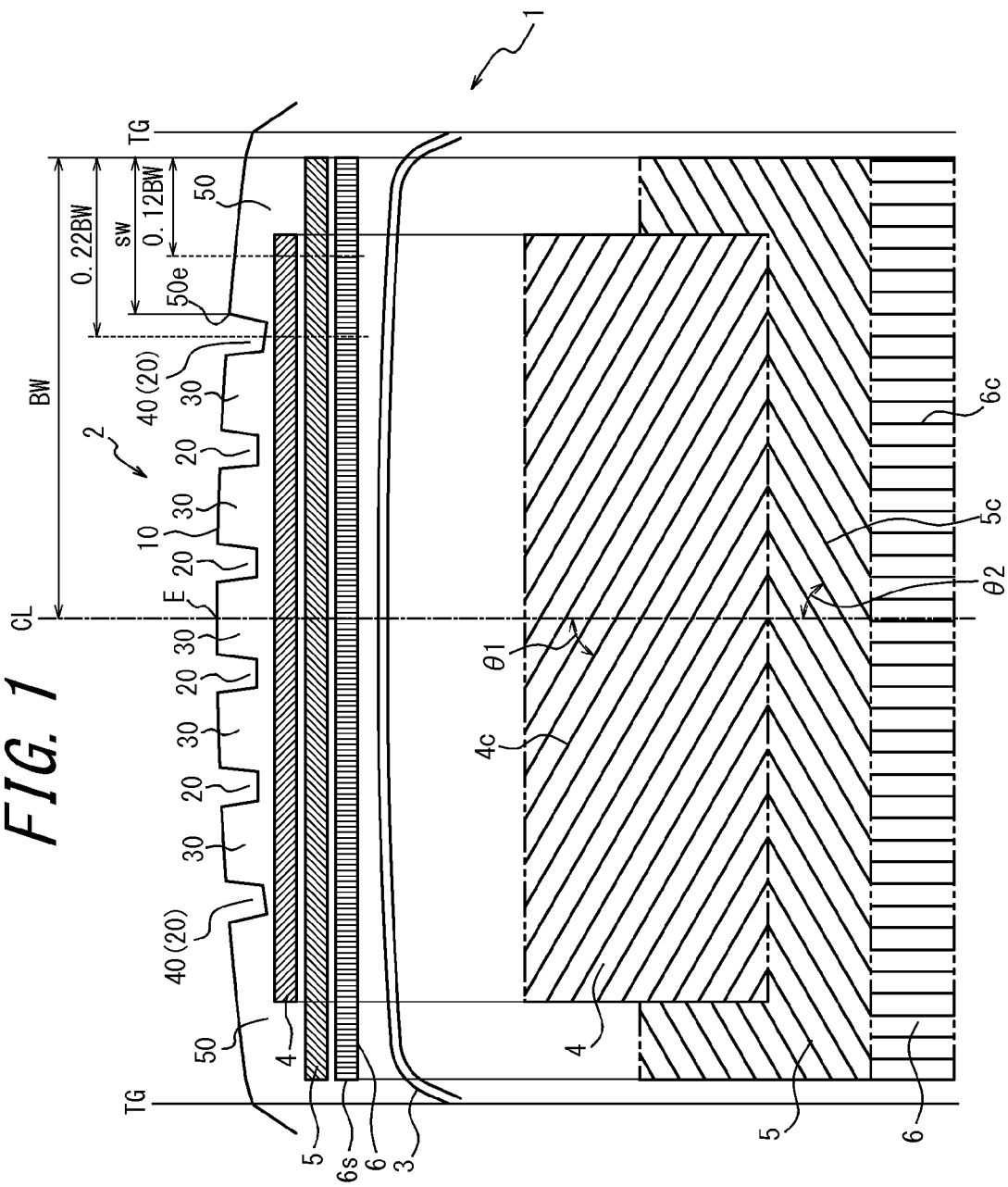
FIG. 1 is a cross-sectional view in the tire width direction showing a tread of a pneumatic tire of an example.

FIG. 1 shows a cross-sectional view in the tire width direction of a tread of a pneumatic tire of an example. The pneumatic tire 1 has a tread 2, a pair of sidewall portions extending inward from side portions of the tread 2 in the tire radial direction (not shown), and a pair of bead portions extending inward from the sidewall portions in the tire radial direction (not shown).

Further, the pneumatic tire 1 includes a radial carcass 3 constituted of at least one ply (one ply in FIG. 1) that toroidally extends between the bead portions.

Although FIG. 1 shows a case where the radial carcass 3 is constituted of one ply, the radial carcass of our pneumatic tire may be constituted of a plurality of plies as appropriate. Further, although FIG. 1 shows a case where the carcass is a radial carcass, the carcass of our pneumatic tire may be a bias-ply carcass.

In the pneumatic tire 1, the tread 2 has two inclined belt layers 4 and 5 obtained by rubber-coating a plurality of cords that are arranged parallel to one another and extended and inclined with respect to the tread circumferential direction; and a circumferential belt layer 6 obtained by rubber-coating a plurality of cords that are located on the inner side of the inclined belt layers 4 and 5 in the tire radial direction, are arranged parallel to one another, and are extended in the tread circumferential direction.

Note that our pneumatic tire may only be provided with at least one inclined belt layer and at least one circumferential belt layer.

Further, a tread surface 10 is provided with a plurality of circumferential grooves 20 extended in the tread circumferential direction as shown in FIG. 1, and of the circumferential grooves 20, ones located outermost in the tire width direction are widthwise outermost circumferential grooves 40 (20). Shoulder land portions 50 are partitioned between the widthwise outermost circumferential grooves 40 and tread ground contact ends TG.

Note that the pneumatic tire 1 is provided with four circumferential grooves 20 in addition to the widthwise outermost circumferential grooves 40. Further, land portions 30 are partitioned between the circumferential grooves 20.

Positions of the tread surface that correspond to outermost ends 6s in the tire width direction of the circumferential belt layer are within the shoulder land portions 50. In other words, the shoulder land portions 50 are located so as to toroidally extend over the widthwise outermost circumferential belt layer ends 6s in the tire width direction, and the widthwise outermost circumferential belt layer ends 6s are located on the outer sides in the tire width direction of equator side shoulder land portion ends 50e.

Note that the number of circumferential grooves extending in the tread circumferential direction of our pneumatic tire may only be more than one. Further, the circumferential grooves are not necessarily straight lines parallel in the tread circumferential direction, but may be in a zigzag pattern or in a wavy form.

Further, for our pneumatic tire, when a plurality of circumferential belt layers are provided, the widthwise outermost circumferential belt layer ends refer to the circumferential belt layers that are located outermost in the tire width direction.

Here, in the pneumatic tire 1, the distance in the tire width direction between the widthwise outermost circumferential belt layer ends 6s and the equator side shoulder land portion ends 50e (distance sw) is required to be 12% or more and 22% or less of a half of the width of the circumferential belt layer in tire width direction (half width BW).

With the above distance sw in the tire width direction being 12% or more of the half width BW of the circumferential belt layer in the tire width direction, the rigidity in the tire width direction associated with shear strain can be improved, in other words, the side force acting on the tire can be increased, thereby improving the steering stability achieved using the tire. Further, an effect of increasing the width of the circumferential belt layer that leads, for example, to suppression of the increase in the diameter in shoulder side regions can be achieved. Thus, the durability of the tire can be ensured.

Further, with the above distance sw in the tire width direction being 22% or less of the half width BW of the circumferential belt in tire width direction, the area of regions where the crushing force in the direction opposite to the direction of the side force acts on the equator side shoulder land portions can be reduced. In addition, the area of regions where shear force is generated due to relative displacements of the belts and the tread in the direction of the side force can be increased. Accordingly, the side force acting on the tire increases, so that the steering stability achieved by the tire can be improved.

Figure 3:
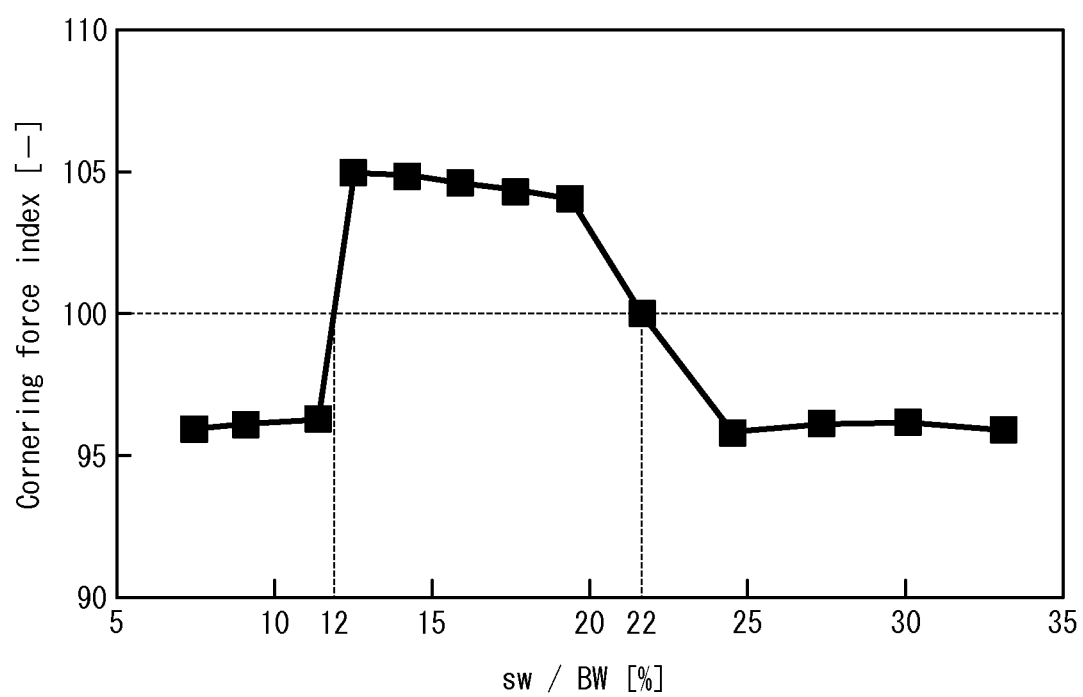
FIG. 3 is a diagram for the pneumatic tire of the example shown in FIG. 1, showing the relationship between the distance in the tire width direction between the widthwise outermost circumferential belt layer ends and the equator side shoulder land portion ends and the cornering force (side force) acting on the tire.

FIG. 3 shows, for the pneumatic tire 1, the relationship between the ratio of the distance sw in the tire width direction between the widthwise outermost circumferential belt layer ends and the equator side shoulder land portion ends with respect to the half width BW of the circumferential belt layer in the tire width direction, and the cornering force (side force) acting on the tire. The cornering force is expressed as an index for relative evaluation with the evaluation result of a tire of Comparative Example 1 being 100. This result shows that the cornering force (side force) can be significantly improved with sw being 12% or more and 22% or less of BW.

For the pneumatic tire 1, regardless of whether the number of the circumferential belt layers is one or more, the widthwise outermost circumferential belt layer ends 6s are preferably located on the outer sides in the tire width direction of the positions where the rate of increase in the tire diameter is A % (described below) after the tire is mounted on an approved rim and inflated to a predetermined air pressure. Here, A % represents the rate of increase in the tire diameter corresponding to the elongation rate (%) of a cord constituting the circumferential belt layer when the cord is subjected to a tensile test to show an elastic modulus of 10% of the elastic modulus E1 at breakage.

With the widthwise outermost circumferential belt layer ends 6s being located as described above, when the circumferential belt layer is extended to regions where the rate of increase in the tire diameter is equal to or less than a predetermined value, the effect of increasing the width of the circumferential belt layer can be ensured.

For the pneumatic tire 1 of the example shown in FIG. 1, the ratio of the width of the inclined belt layers 4 and 5 in the tire width direction with respect to the width of the circumferential belt layer 6 in the tire width direction is preferably 65% to 90%. The above relationship can increase the in-plane bending rigidity of the belt including the inclined belt layers.

Figure 2A:
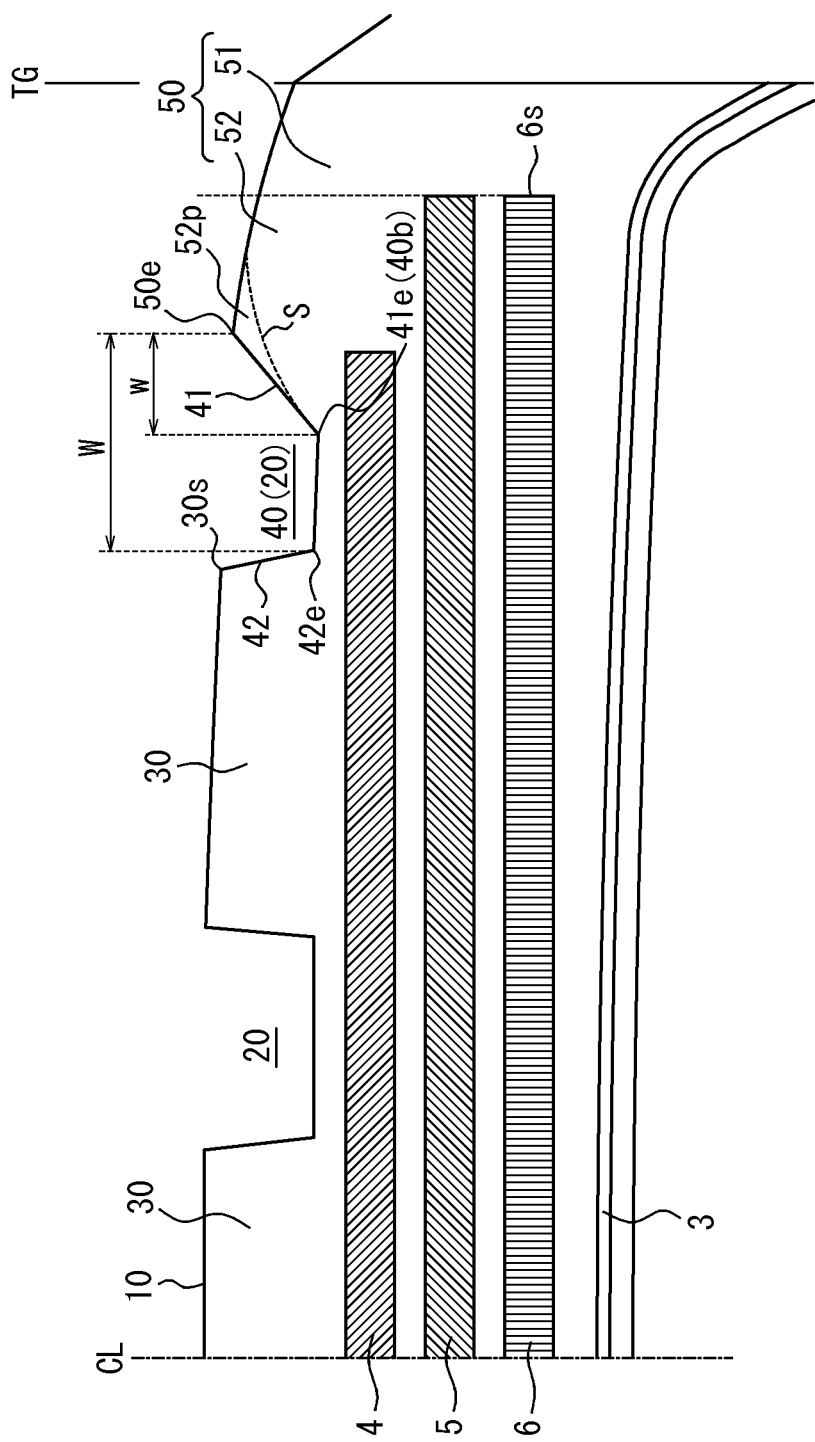
FIG. 2A is a view showing a half of the tread of the pneumatic tire of the example shown in FIG. 1 on a larger scale.

FIG. 2A shows a view of a half of the pneumatic tire 1 of the example shown in FIG. 1 on a larger scale.

Figure 2B:
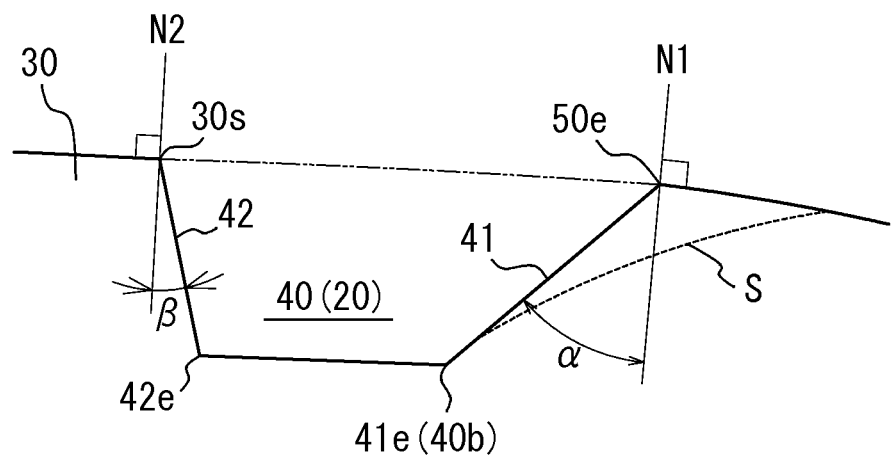
FIG. 2B is a view showing a shoulder land portion of the tire shown in FIG. 2A on a larger scale.

As shown in FIG. 2B, in the cross section of the pneumatic tire 1 in the tire width direction, the angle of inclination $\alpha$ of groove walls 41 on the outer sides in the tire width direction of the widthwise outermost circumferential grooves 40 with respect to imaginary lines N1 extending through the equator side shoulder land portion ends 50e and intersecting the tread surface 10 at right angles is larger than the angle of inclination $\beta$ of groove walls 42 on the tire equator sides of the widthwise outermost circumferential grooves 40 with respect to imaginary lines N2 extending through outer ends 30s in the tire width direction of the land portions 30 adjacent one another to the shoulder land portions 50 in the tire width direction and intersecting the tread surface 10 at right angles.

For the widthwise outermost circumferential grooves 40, when the inclination angle $\alpha$ of the groove walls 41 on the outer sides in the tire width direction is larger than the inclination angle $\beta$ of the groove walls 42 on the tire equator side as described above, the rigidity of the shoulder land portions can be improved, and the amount of displacement of the shoulder land portions due to the load can be effectively reduced. Thus, the crushing force is reduced at the shoulder land portions. Here, the crushing force acting on the tire equator sides of the shoulder land portions in the direction opposite to the direction of the side force is expressed as a product of the rigidity of the land portions and the displacement amount of the land portions. Accordingly, the phenomenon in which the side force acting on the tire due to a slip angle applied to the tire is partially cancelled can be effectively prevented, thereby further improving the steering stability achieved using the tire.

Note that since the widthwise outermost circumferential grooves 40 are preferably provided so as to have larger width in the tire width direction outward in tire diameter direction in order to ensure the generation of the crushing force.

Specifically, as shown in FIG. 2A, the rate of reduction in the groove bottom width of the widthwise outermost circumferential grooves 40 due to the groove walls 41 on the outer sides in the tire width direction of the widthwise outermost circumferential grooves 40 is preferably 7% to 100%. Specifically, when the distance in the tire width direction between the equator side shoulder land portion ends 50e and tire equator side groove bottom ends 42e of the widthwise outermost circumferential grooves is represented by W and the distance in the tire width direction between the equator side shoulder land portion ends 50e and tire widthwise outer groove bottom ends 41e of the widthwise outermost circumferential grooves is represented by w, the ratio w/W is preferably 0.07 or more and 1.0 or less.

The above reduction rate being 7% or more can ensure the effect in reducing the crushing force in the direction opposite to the direction of the side force. Further, the above reduction rate being 100% or less can prevent the above effect in reducing the crushing force, which is achieved by increasing the rigidity of the shoulder land portions, from exerting on the outer sides in the tire width direction of the shoulder land portions in addition to the tire equator sides of the shoulder land portions. Therefore, the crushing force acting on the outer sides of in the tire width direction of the shoulder land portions in the direction of the side force is prevented from being suppressed, and the side force acting on the shoulder land portions can be prevented from being reduced.

Figure 2C:
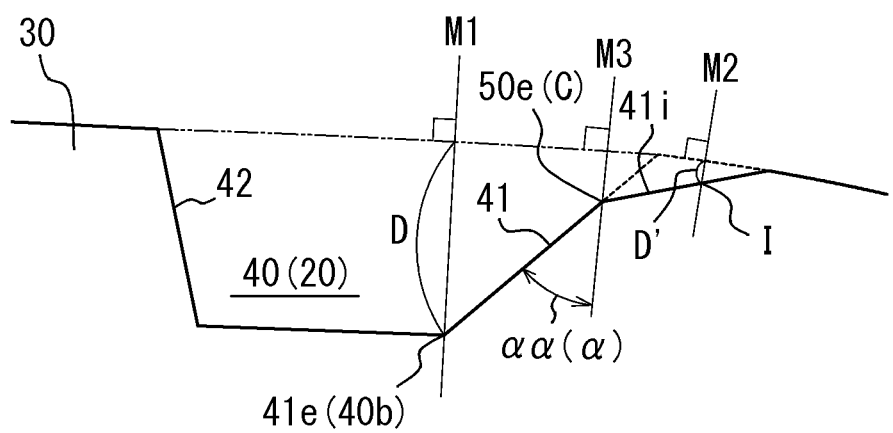
FIG. 2C is a view showing a shoulder land portion of the tire shown in FIG. 2A on a larger scale.

Further, in the pneumatic tire 1, the groove walls 41 on the outer sides in the tire width direction of the widthwise outermost circumferential grooves preferably have inclined surfaces 41i as shown in FIG. 2C. The inclined surfaces 41i gradually increase the distance D' between the inclined surfaces 41i and the tread surface contour (shown by the two-dot chain line in FIG. 2) from the outer sides in the tire width direction toward the widthwise outermost circumferential grooves 40 side and extend to the groove walls 41 on the outer sides in the tire width direction of the widthwise outermost circumferential grooves at points C (hereinafter referred to as "continuation points C").

Here, the above distance D' refers to the distance in the direction of imaginary lines M2 extending through points I on the inclined surfaces 41i and intersecting the tread surface contour at right angles between the points I and the tread surface contour. The height D of the shoulder land portions 50 refers to the distance between points 40b (41e) and the tread surface contour in the direction of imaginary lines M1 extending through the points 40b located innermost in the tire width direction of the points on the groove bottoms of the widthwise outermost circumferential grooves 40 (the points 40b are identical with the tire widthwise outer groove bottom ends 41e of the groove walls 41 on the outer side in the tire width direction of the widthwise outermost circumferential grooves in FIG. 2) and intersecting the tread surface contour (shown by the two-dot chain line in FIG. 2) at right angles. Here, the relationship of D>D' is satisfied.

Note that when the above inclined surfaces 41i are provided, the equator side shoulder land portion ends 50e is identical with the continuation points C. In this case, the inclination angle $\alpha$ of the groove walls 41 on the outer side in tire width direction of the widthwise outermost circumferential grooves is the inclination angle $\alpha\alpha$ of the groove walls 41 on the outer side in tire width direction of the widthwise outermost circumferential grooves with respect to imaginary lines M3 extending through the continuation points C and intersecting the tread surface contour at right angles.

With the provision of such groove walls 41 on the outer side in tire width direction of the widthwise outermost circumferential grooves, specifically, the inclined surfaces 41i on the equator side shoulder land portions 52, when the equator side shoulder land portions located between the circumferential belt layer and the tread surface is deformed to bulge on the tire equator side due to the slip angle applied to the tire, the presence of the inclined surfaces reduces the area of the equator side shoulder land portions; thus, the deformation amount of that portion can be reduced. Accordingly, crushing force typically expressed as a product of the rigidity of the land portions and the deformation amount of the land portions is effectively reduced at that portion, so that the phenomenon in which the side force acting on the tire due to a slip angle applied to the tire is partially cancelled can be effectively prevented, thereby further improving the steering stability achieved using the tire.

Here, D'/D, the rate of reduction in the height D of the shoulder land portions 50 due to the provision of the inclined surfaces 41i is preferably 10% or more and 50% or less.

D'/D of 10% or more can ensure the effect in reducing the crushing force, obtained by providing the inclined surfaces. D'/D of 50% or less can ensure the ground contact area of the shoulder land portions and the improvement of the steering stability.

Figure 4:
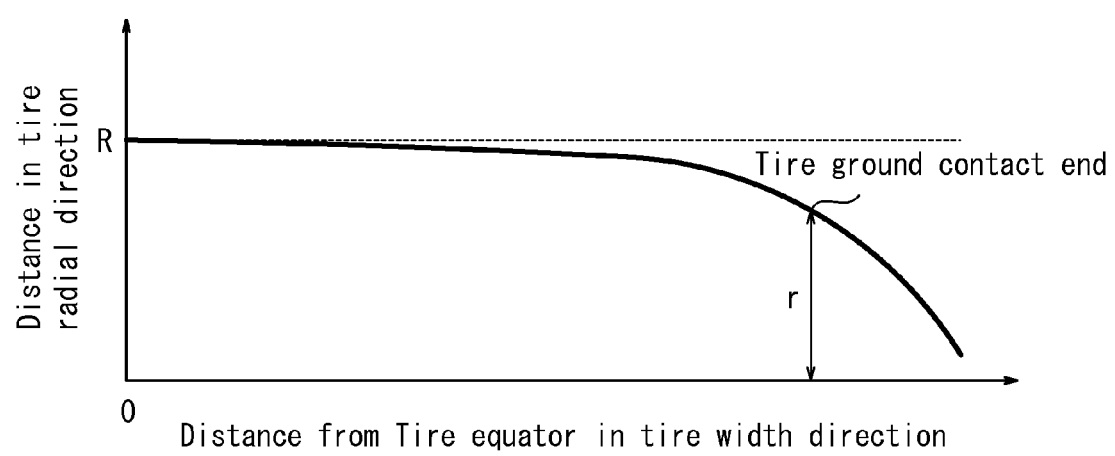
FIG. 4 is a diagram for the pneumatic tire of the example shown in FIG. 1, showing the relationship between the distance in the tire width direction of a point of the tread surface from the tire equator and the distance in the tire radial direction between the foregoing point and the rotation axis of the tire.

FIG. 4 shows the relationship between the distance in the tire width direction of a point of the tread surface 10 of the pneumatic tire 1 from the tire equator CL and the distance in the tire radial direction between the foregoing point and the rotation axis (not shown) of the tire.

Here, in the pneumatic tire 1, the distance r between the tread ground contact ends TG and the rotation axis of the tire is smaller as compared with the distance R between the tire equator CL and the rotation axis of the tire, and the rate of reduction in the distance is preferably more than 0% and 1.5% or less. In other words, the rate of reduction of r with respect to R represented by (R−r)/R is more than 0 and 0.015 or less.

With the above structure, when grounding, the widthwise cross-sectional shape can be substantially rectangular and the tread surface can be extended to the outside in the tire width direction. Accordingly, the area of regions of the shoulder land portions on the outer side in the width direction, which cause the crushing force in the direction of the side force is increased to increase the side force acting on the tire, thereby further improving the steering stability achieved using the tire.

Further, for the pneumatic tire 1, the compressive modulus (Ec) of the equator side shoulder land rubber members provided on portions 52p of the equator side shoulder land portions is preferably lower as compared with the compressive modulus (Es) of the rubber members placed on the outer sides in the tire width direction of the foregoing rubber members, as shown in FIG. 2A.

With the above structure, the deformation caused in the entire shoulder land portions due to a slip angle applied to the tire can be substantially constant, and the rigidity of the equator side shoulder land portions can be relatively reduced. Thus, the crushing force typically expressed as a product of the rigidity of the land portions and the deformation amount of the land portions can be effectively reduced in the entire shoulder land portions. Further, the rigidity of the outer portions in the width direction of the shoulder land portions can be relatively increased, thereby increasing the side force generated by applying a slip angle. Therefore, the phenomenon in which the side force is partially cancelled by the crushing force can be effectively prevented and the side force can be increased, thereby improving the steering stability achieved using the tire.

Here, Ec/Es, the ratio of Ec with respect to Es, is preferably 0.9 or less. Ec/Es within that range can improve the side force by 2% or more.

Further, in the pneumatic tire 1, the boundaries S between the equator side shoulder land rubber members and the rubber members provided on the outer sides in the tire direction of the foregoing rubber members are preferably curved surfaces extended and inclined with respect to a plane parallel to the tire equatorial plane as shown in FIG. 2B.

Note that the boundaries S are not limited to such a curved surface as shown in FIG. 2B, and may be flat surfaces.

With the boundaries being inclined as described above, while maximizing the shear modulus of the outer portions in the width direction of the shoulder land portions, only the crushing shear force generated in the vicinity of the equator side shoulder land portions can be reduced.

The thickness of the equator side shoulder land rubber members is preferably increased gradually from the outer sides in the tire width direction toward the widthwise outermost circumferential grooves.

The thickness of the rubber members is gradually increased as described above, so that while suppressing the reduction in the rigidity of the outer portions in the width direction of the shoulder land portions, only the crushing shear force generated in the vicinity of the equator side shoulder land portions can be reduced.

Note that in the pneumatic tire 1, the inclination angle θ1 of cords 4c constituting the inclined belt layer 4 with respect to the tread circumferential direction can be, for example, 35° to 55°. Meanwhile, the inclination angle θ2 of the cords 5c constituting the inclined belt layer 5 with respect to the tread circumferential direction can be, for example, 35° to 55°. In FIG. 1, the inclined belt layers 4 and 5 are provided such that the cords 4c and the cords 5c cross each other, thereby forming crossing belt layers. In particular, in the pneumatic tire 1, the cords 4c and 5c are provided such that their inclination directions are opposite to each other in the tread circumferential direction.

θ1 within the above range can increase the in-plane shear modulus of the belt and can improve the side force. θ2 within the above range can increase the in-plane shear modulus of the belt and can improve the side force.

Note that of the angles between the directions in which the above respective cords extend and the tread circumferential direction, θ1 and θ2 refer to the smaller angles.

Further, cords 6c constituting the circumferential belt layer 6 may extend in a straight line shape, in a zigzag pattern, or in a wavy form in the tread circumferential direction. Further, the cords can extend and inclined at a predetermined angle, for example, at 0° to 5° with respect to the tread circumferential direction, and can extend spirally in the tire width direction. Further, the cords 6c may be cords having characteristics of being elongated greatly even by low tensile force until the elongation reaches approximately 2%, and being elongated only slightly even by high tensile force after the elongation rate exceeds the value, that is, high initial elongation cords, as they are called, for example, steel twisted cords.

EXAMPLES

Our pneumatic tire will now be described in more detail using Examples without being restricted to the following Examples by any means.

Tires used in Examples have two inclined belt layers, one circumferential belt layer, shoulder land portions having a height of 15 mm, and six circumferential grooves The ratios of the widths in the tire width direction of land portions partitioned between tread ground contact ends and the circumferential grooves and between the circumferential grooves were 1.8:1:1:1:1:1:1.8 from an outer side in the tire width direction of the tread surface toward the other outer side in the tire width direction.

Example 1

A tire having the specifications shown in Table 1 was prepared and subjected to the following evaluations.

Comparative Example 1

A tire having the specifications shown in Table 1 was prepared and subjected to the following evaluations in the same manner as Example 1.

A tire for trucks and buses (435/45R22.5) were mounted on an approved rim (14.00×22.5) specified in JATMA, thereby preparing a tire-rim assembly. The assembled tire was subjected to a steering stability test described below under the conditions of internal pressure: 900 kPa and load: 5000 kgf and driving performance of the pneumatic tire was evaluation.

(Steering Stability Test)

The pneumatic tire was made to run on a drum of a drum tester at a camber angle of 0° at a speed of 50 km/h. The cornering force at a cornering angle of 1° was measured to evaluate the pneumatic tire. Specifically, an index for relative evaluation with the evaluation result of the tire of Comparative Example 1 being 100 was calculated. The evaluation results are shown in Table 1. A larger index indicates better steering stability achieved using the pneumatic tire.

Comparative Examples 2 to 6, Examples 2 to 13

Tires having the specifications shown in Table 1 were prepared and subjected to the driving performance evaluation in the same manner as Example 1 except the foregoing tires were used.

TABLE 1

| | Comparative Example 1 | Comparative Example 2 | Comparative Example 3 | Comparative Example 4 | Comparative Example 5 | Comparative Example 6 | Example 1 | Example 2 | Example 3 | Example 4 |
|---|---|---|---|---|---|---|---|---|---|---|
| Distance in tire width direction between Equator side shoulder land portion ends and Widthwise outermost circumferential belt layer ends/Width of Circumferential belt layer in tire width direction sw/BW (%) | 22 | 22 | 22 | 22 | 22 | 22 | 7.4 | 9.1 | 11.4 | 12.6 |
| Rate of reduction in width of Groove bottom w/W (%) | — | 15 | — | — | — | — | — | — | — | — |
| Rate of reduction in height of Shoulder land portion due to Inclined surface D'/D (%) | — | — | 66.7 | — | — | — | — | — | — | — |
| (Distance between Tire equator and Tire rotation axis − Distance between Tread ground contact end and Tire rotation axis)/Distance between Tire equator and Tire rotation axis (R − r)/R (%) | 1.73 | 1.73 | 1.73 | 1.73 | 1.46 | 1.73 | 1.73 | 1.73 | 1.73 | 1.73 |
| Compressive modulus of Rubber placed on Shoulder land portion (Equator side land portion/Outer portion in the tire width than Equator side shoulder land portion) (%) | 100/100 | 100/100 | 100/100 | 100/100 | 100/100 | 80/100 | 100/100 | 100/100 | 100/100 | 100/100 |
| Cornering force index (—) | 100 | 104.5 | 102 | 107 | 112.3 | 105.5 | 96.0 | 96.2 | 96.3 | 105.0 |

| | Example 5 | Example 6 | Example 7 | Example 8 | Example 9 | Example 10 | Example 11 | Example 12 | Example 13 |
|---|---|---|---|---|---|---|---|---|---|
| Distance in tire width direction between Equator side shoulder land portion ends and Widthwise outermost circumferential belt layer ends/Width of Circumferential belt layer in tire width direction sw/BW (%) | 14.3 | 16 | 17.7 | 19.4 | 22 | 24.6 | 27.4 | 30.3 | 33.1 |
| Rate of reduction in width of Groove bottom w/W (%) | — | — | — | — | — | — | — | — | — |
| Rate of reduction in height of Shoulder land portion due to Inclined surface D'/D (%) | — | — | — | — | — | — | — | — | — |
| (Distance between Tire equator and Tire rotation axis − Distance between Tread ground contact end and Tire rotation axis)/Distance between Tire equator and Tire rotation axis (R − r)/R (%) | 1.73 | 1.73 | 1.73 | 1.73 | 1.73 | 1.73 | 1.73 | 1.73 | 1.73 |
| Compressive modulus of Rubber placed on Shoulder land portion | 100/100 | 100/100 | 100/100 | 100/100 | 100/100 | 100/100 | 100/100 | 100/100 | 100/100 |

TABLE 1-continued

| (Equator side land portion/ Outer portion in the tire width than Equator side shoulder land portion) (%) | | | | | | | | |
|---|---|---|---|---|---|---|---|---|
| Cornering force index (—) | 104.9 | 104.7 | 104.4 | 104.1 | 100.0 | 95.9 | 96.2 | 96.2 | 96.0 |

INDUSTRIAL APPLICABILITY

We can provide a pneumatic tire which ensures durability of the tire and improves the steering stability.

REFERENCE SIGNS LIST

1: Pneumatic tire; 2: Tread; 3: Radial carcass; 4, 5: Inclined belt layers; 4c, 5c: Cords; 4i: Inclined surface; 6: Circumferential belt layer; 6c: Cords; 6s: Widthwise outermost circumferential belt layer end; 10: Tread surface; 20: Circumferential groove; 30: Land portion; 40: Widthwise outermost circumferential groove; 41: Groove wall on the outer side in the tire width direction of Widthwise outermost circumferential groove; 42: Groove wall on the tire equator side of Widthwise outermost circumferential groove; 41e: Groove bottom end on the outer side in the tire width direction of Widthwise outermost circumferential groove; 42e: Groove bottom end on the tire equator side of Widthwise outermost circumferential groove; 50: Shoulder land portion; 50e: Equator side shoulder land portion end; 51: Outer portion in the width direction of Shoulder land portion; 52: Equator side portion of Shoulder land portion; 52p: Portion of Equator side portion of Shoulder land portion; BW: Half width in the tire width direction of Circumferential belt layer; C: Continuation point; CL: Tire equatorial plane; E: Tire equator; N1, N2: Imaginary lines intersecting Tread surface at right angles; M1, M2, M3: Imaginary lines intersecting Tread surface contour at right angles; sw: Distance in tire width direction between the equator side shoulder land portion end and widthwise outermost circumferential belt layer end; S: Boundary; TG: Tread ground contact end; $\alpha$, $\beta$, $\alpha\alpha$: Inclination angle of Groove wall; $\theta 1$, $\theta 2$, $\theta 3$: Inclination angle of Cords

The invention claimed is:

1. A pneumatic tire comprising:
    on a tread of the tire, at least one inclined belt layer obtained by rubber-coating a plurality of cords that are extended and inclined with respect to the tread circumferential direction and are arranged parallel to one another, and at least one circumferential belt layer obtained by rubber-coating a plurality of cords that are extended in the tread circumferential direction and are arranged parallel to one another, the at least one circumferential belt layer being located on the inner side of the at least one inclined belt layer in the tire radial direction; and
    on the tread surface, a plurality of circumferential grooves extending in the tread circumferential direction, and shoulder land portions partitioned between the circumferential grooves located outermost in the tire width direction and tread ground contact ends,
    wherein positions of the tread surface that correspond to the outermost ends of the at least one circumferential belt layer in the tire width direction are within the shoulder land portions, and the distance in the tire width direction between the outermost ends in the tire width direction of the at least one circumferential belt layer and tire equator side ends of the shoulder land portions is 12% or more and 22% or less of a half of the width of the at least one circumferential belt layer in tire width direction; and
    wherein the outermost ends of the at least one circumferential belt layer in the tire width direction are located between widthwise center points of the shoulder land portions and the tread ground contact ends.

2. The pneumatic tire according to claim 1, wherein the distance between the tread ground contact ends and the rotation axis of the tire is smaller than the distance between the tire equator and the rotation axis of the tire by more than 0% and 1.5% or less.

3. The pneumatic tire according to claim 1, further comprising land portions partitioned between the circumferential grooves,
    wherein in the cross section in the tire width direction, the angle of inclination of groove walls on the outer sides in the tire width direction of the circumferential grooves located outermost in the tire width direction with respect to imaginary lines extending through the tire equator side ends of the shoulder land portions and intersecting the tread surface at right angles is larger than the angle of inclination of groove walls on the tire equator sides of the circumferential grooves located outermost in the tire width direction with respect to imaginary lines extending through outer ends in the tire width direction of the land portions adjacent to the shoulder land portions in the tire width direction and intersecting the tread surface at right angles.

4. The pneumatic tire according to claim 1, wherein tire equator side portions of the shoulder land portions are each provided with an inclined surface that gradually reduces the height of the shoulder land portions from the outer sides in the tire width direction toward the circumferential grooves located outermost in the tire width direction and continuously extends to the groove walls on the outer side in the tire width direction of the circumferential grooves located outermost in the tire width direction.

5. The pneumatic tire according to claim 1,
    wherein rubber members arranged at the tire equator side portions of the shoulder land portions have a lower compressive modulus as compared with rubber members arranged on the outer sides in the tire width direction of the rubber members of the shoulder land portions, and the boundaries between the rubber members are flat or curved surfaces extended and inclined with respect to a plane parallel to the tire equatorial plane and the thickness of the rubber members arranged at the tire equator side portions of the shoulder land portions gradually increases from the outer side in the tire width direction toward the circumferential grooves.

6. The pneumatic tire according to claim 1, comprising
    wherein the at least one inclined belt layer consists of two inclined belt layers, and
    wherein the at least one circumferential belt layer consists of a single circumferential belt layer.

* * * * *